Patented June 16, 1942

2,286,763

UNITED STATES PATENT OFFICE 2,286,763

METHYL SILICON HALIDES

Eugene G. Rochow, West Albany, N. Y., assignor to General Electric Company, a corporation of New York No Drawing. Application December 26, 1940, Serial No. 371,771

3 Claims. (Cl. 260—607)

This invention relates to new chemical compounds and to their preparation. More particularly, it is concerned with new and useful compounds of silicon, a halide such as chlorine or bromine, and at least one methyl group attached directly to the silicon.

The present application is a continuation-in-part of my copending application Serial No. 287,787, filed August 1, 1939 and assigned to the same assignee as the present invention, which describes and claims certain polymeric organo-silicon compounds comprising chemical compounds of silicon, oxygen and at least one methyl group attached directly to silicon. The present invention specifically relates to and has as its principal object the preparation and isolation of the methyl silicon halides which may be used, for example, in the preparation of the organo-silicon compounds of my above-identified copending application.

Although organo-silicon compounds have been known and studied extensively for nearly eighty years, so far as I am aware I am the first to succeed in the preparation and isolation of pure methyl silicon halides, specifically methyl silicon chlorides. Such compounds have the general formula $(CH_3)_nSiX_{4-n}$, where $n$ is 1, 2 or 3 and X represents a halogen atom such as chlorine or bromine. Such compounds of this type include monomethyl silicon trichloride $CH_3SiCl_3$ and dimethyl silicon dichloride $(CH_3)_2SiCl_2$.

I have found that the compounds of my invention may be prepared by allowing a suitable Grignard reagent, such as methyl magnesium chloride, to react slowly with a silicon tetrahalide, such as silicon tetrachloride, in ethereal solution, separating the precipitated magnesium salts and thereafter repeatedly fractionating the liquid portion of the reaction mixture to recover the respective methyl substituted silicon chlorides.

Solutions of these methyl silicon halides were formed in accordance with the following procedure set forth in my above-mentioned copending application.

An ether solution of 1.75 mols of methyl magnesium bromide is added at such rate, and the stirring to an ether solution containing 1 mol of silicon tetrachloride, the latter solution being cooled to minus 20° C. or lower prior to the addition of the former. The solution of methyl magnesium bromide is added at such rate, and the reaction mixture so cooled, that the temperature of the mixture does not rise above about 0° C. Preferably the reaction mixture is maintained at minus 20° C. or lower.

Since the amount of methyl magnesium bromide employed is insufficient to convert all the silicon tetrachloride to the dimethyl derivative, there is formed a mixture of monomethyl and dimethyl silicon chlorides, thus:

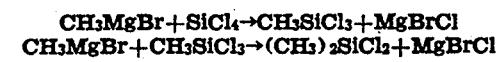

Probably a smaller amount of trimethyl silicon chloride also is formed:

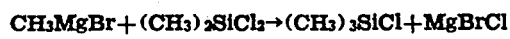

The magnesium salts separate as a granular mass, leaving the silicon derivatives in ether solution.

For the preparation of polymers in accordance with the teachings of my copending application, the methyl silicon chloride was immediately hydrolyzed in solution and the hydrolysis products condensed to form the polymeric methyl silicones. These reactions seemingly indicated the presence of methyl silicon chloride in the solution prior to hydrolysis. I have found that when the unhydrolyzed solution remaining after separation of the magnesium salts is subjected to extended distillation through suitable fractionating equipment, the various methyl-substituted products can be isolated. The monomethyl silicon chloride has been found to have a boiling point about 66.0° to 67.0° C. at 766 mm. and the dimethyl product a boiling point about 69.0° to 70.2° C. at 744.5 mm. Obviously, this separation requires the use of fractionating equipment designed especially for separating materials having boiling points close to one another.

Acceptable yields of methyl silicon chlorides containing mostly the dimethyl silicon dichloride may be obtained by the following procedure. About 1.25 mols of silicon tetrachloride and 0.95 liter of dibutyl ether are placed in a flask equipped with a condenser held at minus 78.5° C. by means of solid carbon dioxide, a mechanical stirrer, and a separatory funnel, the condenser being protected from moisture by a drying tube containing activated alumina. The flask is placed in a bath of solid carbon dioxide and alcohol at minus 40° C. and 3.3 liters of a 1 molar solution of methyl magnesium chloride in dibutyl ether is slowly added in small successive quantities by means of the separatory funnel. The reaction mixture is constantly agitated during the period of 2 to 2½ hours taken for the addition of the Grignard reagent. Preferably the Grignard reagent has been previously refluxed to remove excess methyl chloride.

After removal of the precipitated magnesium salts, the flask is connected to a series of liquid air traps and subjected to a rough vacuum to collect about 350 cc. of condensate in the traps. This condensate containing the desired methyl magnesium chloride is then repeatedly distilled under atmospheric pressure and the material boiling at from 69.0° to 70.2° C. is recovered. Chemical analysis of this portion of the distillate indicates its composition to be $(CH_3)_2SiCl_2$. Vapor density determination of its molecular weight gives values of 132 and 134, the latter being obtained at the higher pressure. These values are in good agreement with the theoretical molecular weight value of 129 for dimethyl silicon dichloride. The vapor pressure of the liquid product was 44.5 mm. at 0° C. and 133 mm. at 25° C.

It is to be understood that the preparation may be carried out in any solvent suitable for use with the Grignard reagents. Preferably, aliphatic ethers such as the ethyl or butyl ethers are used. Larger yields of purer materials are obtained with ethyl ether. Because of its lower boiling point, ethyl ether can be more readily separated from the liquid reaction product during fractionation.

The monomethyl silicon trichloride may be obtained by gradually adding 1.6 liters of methyl magnesium chloride (3.1 M.) to 3.97 mols of silicon tetrachloride in 1 liter of diethyl ether at room temperature. After separation of the precipitated magnesium salts and the removal of the diethyl ether by distillation through suitable fractionating equipment, the liquid residue is further fractionally distilled and the portion boiling between 65.0° and 67.5° C. is collected. Redistillation of 115 gms. of this portion yields 60 gms. of methyl silicon trichloride isolated as boiling between 66° and 67° C. at 755.4 mm.

It is to be noted that the methyl silicon halides are abnormal in that their boiling points do not fall between the boiling points of silicon tetramethyl (26° C.) and of silicon tetrachloride (67.6° C.), as would be expected from their composition.

With any of the above methods of preparation, care must be taken to exclude moisture from the reaction mixtures as all of the methyl silicon chlorides are easily hydrolyzed to form complex polymers in accordance with the teachings of my above-mentioned copending application.

What I claim as new and desire to secure by Letters Patent of the United States is:

1. The method of preparing methyl silicon chlorides which comprises slowly introducing a methyl magnesium halide in small successive quantities into an agitated, cooled, anhydrous, ether solution of silicon tetrachloride under anhydrous conditions, removing the precipitated magnesium salts, distilling the remaining liquid material to remove the ether solvent, and repeatedly fractionally distilling the liquid residue to recover the mono- and dimethyl silicon chlorides boiling between 66 and 70.2° C.

2. Methyl silicon trichloride prepared in accordance with the process of claim 1 and characterized by a boiling point between 66° and 67° C.

3. Dimethyl silicon dichloride prepared in accordance with the process of claim 1 and having a boiling point between 69° and 70.2° C.

EUGENE G. ROCHOW.

CERTIFICATE OF CORRECTION.

Patent No. 2,286,763.　　　　　　　　　　　　　　June 16, 1942.

EUGENE G. ROCHOW.

It is hereby certified that error appears in the printed specification of the above numbered patent requiring correction as follows: Page 1, first column, line 48, strike out the words "at such rate, and the" and insert instead --slowly and with rapid--; and that the said Letters Patent should be read with this correction therein that the same may conform to the record of the case in the Patent Office.

Signed and sealed this 31st day of August, A. D. 1943.

Henry Van Arsdale,
　　　　　　　　　　　　　　　　　Acting Commissioner of Patents.
(Seal)